United States Patent
Folz et al.

(10) Patent No.: US 11,268,975 B2
(45) Date of Patent: Mar. 8, 2022

(54) ACCELEROMETER SENSITIVITY SELF-CALIBRATION WITH DUTY CYCLE CONTROL OF DRIVE SIGNAL

(71) Applicant: INVENSENSE, INC., San Jose, CA (US)

(72) Inventors: Michele Folz, Pavia (IT); Giacomo Laghi, Los Gatos, CA (US)

(73) Assignee: INVENSENSE, INC., San Jose, CA (US)

( * ) Notice: Subject to any disclaimer, the term of this patent is extended or adjusted under 35 U.S.C. 154(b) by 0 days.

(21) Appl. No.: 16/876,777

(22) Filed: May 18, 2020

(65) Prior Publication Data

US 2021/0190813 A1    Jun. 24, 2021

Related U.S. Application Data (60) Provisional application No. 62/950,385, filed on Dec. 19, 2019.

(51) Int. Cl.
*G01P 15/08* (2006.01)
*G01P 15/125* (2006.01)

(52) U.S. Cl.
CPC ........ *G01P 15/0802* (2013.01); *G01P 15/125* (2013.01); *G01P 2015/0868* (2013.01)

(58) Field of Classification Search
CPC .............. G01P 15/0802; G01P 15/125; G01P 2015/0868; G01P 21/00; G01D 5/24; G01D 5/244
See application file for complete search history.

(56) References Cited

U.S. PATENT DOCUMENTS

| | | | |
|---|---|---|---|
| 5,737,961 A * | 4/1998 | Hanisko | B60R 21/0132 73/1.38 |
| 7,340,956 B2 | 3/2008 | Deb et al. | |
| 8,173,470 B2 | 5/2012 | Mehregany | |
| 10,012,671 B2 | 7/2018 | Lin | |
| 2008/0190199 A1* | 8/2008 | Prandi | G01C 23/005 73/504.12 |
| 2010/0145660 A1 | 6/2010 | Lang et al. | |
| 2013/0152663 A1* | 6/2013 | Balachandran | G01P 21/00 73/1.38 |
| 2013/0265183 A1* | 10/2013 | Kleks | H03M 3/34 341/143 |
| 2016/0103174 A1* | 4/2016 | Aaltonen | G01R 31/2884 324/750.3 |
| 2016/0202286 A1* | 7/2016 | Aaltonen | G01P 21/00 73/1.38 |
| 2016/0298963 A1* | 10/2016 | Kapusta | G01C 19/5776 |
| 2017/0003315 A1 | 1/2017 | Enjalbert et al. | |
| 2020/0011702 A1* | 1/2020 | Clark | G01C 25/005 |
| 2020/0408805 A1* | 12/2020 | Hu | B81C 99/0045 |

* cited by examiner

*Primary Examiner* — Helen C Kwok
(74) *Attorney, Agent, or Firm* — Haley Guiliano LLP; Stefan D. Osterbur (57) ABSTRACT

A MEMS accelerometer includes at least one proof mass and two or more drive electrodes associated with each proof mass. Self-test signals are applied to the drive electrodes. The self-test signals have a signal pattern that includes different duty cycles being applied to the drive electrodes simultaneously, which in turn imparts an electrostatic force on the proof mass. The response of the proof mass to the electrostatic force is measured to determine a sensitivity of the MEMS accelerometer.

14 Claims, 7 Drawing Sheets

ACCELEROMETER SENSITIVITY SELF-CALIBRATION WITH DUTY CYCLE CONTROL OF DRIVE SIGNAL

CROSS-REFERENCE TO RELATED APPLICATION

This application claims priority to U.S. Provisional Patent Application No. 62/950,385, filed Dec. 19, 2019, which is hereby incorporated by reference herein in its entirety.

BACKGROUND

Numerous items such as smartphones, smart watches, tablets, automobiles, aerial drones, appliances, aircraft, exercise aids, and game controllers utilize sensors during their operation (e.g., motion sensors, pressure sensors, temperature sensors, etc.). In commercial applications, microelectromechanical (MEMS) sensors such as accelerometers and gyroscopes capture complex movements and determine orientation or direction. For example, smartphones are equipped with accelerometers and gyroscopes to understand the movement of the smartphone, to augment navigation systems that rely on Global Position System (GPS) information, and to perform numerous other functions. Wearable devices and internet-of-things (IoT) devices constantly measure movement and other characteristics of a person, animal, or electronic device. In another example, drones and aircraft determine orientation based on gyroscope measurements (e.g., roll, pitch, and yaw), and vehicles of all types implement assisted driving to improve safety (e.g., to recognize skid or roll-over conditions).

MEMS sensors, such as MEMS accelerometers, may vary in their performance and operation over time, due to factors such as manufacturing variances, installation into end-use products, normal wear of components over time, environmental conditions where the sensor is operating, and end-use applications. These factors may result in a change in sensitivity over time, such that an output of the MEMS sensor (e.g., a value representative of linear acceleration of a MEMS accelerometer) may no longer accurately represent the force or other parameter being measured. For example, the sensitivity of the MEMS sensor may change such that measurements lack accuracy and/or precision. In some instances, self-testing may be performed on the MEMS sensor such as in a post-manufacturing quality control procedure. The results of the self-test procedure may be utilized to calibrate the MEMS sensor, for example, by modifying processing of a measured signal from the MEMS sensor. Such self-test and calibration procedures may require external test equipment to perform specific operations, or may require that additional components be added to the MEMS sensor.

SUMMARY

In some embodiments of the present disclosure, a microelectromechanical (MEMS) accelerometer comprises a proof mass that moves along a sense axis in response to a linear acceleration, a first drive electrode located adjacent to the proof mass along the sense axis, a second drive electrode located adjacent to the proof mass along the sense axis and on an opposite side of the proof mass from the first drive electrode, and processing circuitry coupled to the proof mass, the first drive electrode, and the second drive electrode. The processing circuitry may be configured to provide a first self-test signal pattern to the first drive electrode and the second drive electrode, wherein the first self-test signal pattern has a first duty cycle applied to the first drive electrode and a first complementary duty cycle applied to the second drive electrode, and measure a first received signal from the proof mass in response to the first self-test signal pattern. The processing circuitry may further be configured to provide a second self-test signal pattern to the first drive electrode and the second drive electrode, wherein the second self-test signal pattern has a second duty cycle applied to the first drive electrode and a second complementary duty cycle applied to the second drive electrode, and to measure a second received signal from the proof mass in response to the second self-test signal pattern. The processing circuitry may be further configured to determine a sensitivity of the MEMS accelerometer based on the first received signal and the second received signal.

In some embodiments of the present disclosure, a MEMS accelerometer comprises a proof mass that moves out of a MEMS plane in response to a linear acceleration, a first drive electrode located adjacent to a first portion of the proof mass in a direction of the movement of the proof mass out of the MEMS plane, a second drive electrode located adjacent to a second portion of the proof mass in the direction of the movement of the proof mass out of the MEMS plane, and processing circuitry coupled to the proof mass, the first drive electrode, and the second drive electrode. The processing circuitry may be configured to provide a first self-test signal pattern to the first drive electrode and the second drive electrode, wherein the first self-test signal pattern has a first duty cycle applied to the first drive electrode and a first complementary duty cycle applied to the second drive electrode, and to measure a first received signal from the proof mass in response to the first self-test signal pattern. The processing circuitry may be further configured to provide a second self-test signal pattern to the first drive electrode and the second drive electrode, wherein the second self-test signal pattern has a second duty cycle applied to the first drive electrode and a second complementary duty cycle applied to the second drive electrode, and to measure a second received signal from the proof mass in response to the second self-test signal pattern. The processing circuitry may further be configured to determine a sensitivity of the MEMS accelerometer based on the first received signal and the second received signal.

In some embodiments of the present disclosure, a method for performing self-test calibration of a MEMS accelerometer comprises providing a first self-test signal pattern to a first drive electrode and a second drive electrode, wherein the first self-test signal pattern has a first duty cycle applied to the first drive electrode and a first complementary duty cycle applied to the second drive electrode, wherein the first drive electrode is located adjacent to a proof mass along a sense axis, wherein the second drive electrode is located adjacent to a different portion of the proof mass along the sense axis, and wherein the proof mass moves along the sense axis in response to a linear acceleration. The method may further comprise measuring a first received signal from the proof mass in response to the first self-test signal pattern. The method may further comprise providing a second self-test signal pattern to the first drive electrode and the second drive electrode, wherein the second self-test signal pattern has a second duty cycle applied to the first drive electrode and a second complementary duty cycle applied to the second drive electrode. The method may further comprise measuring a second received signal from the proof mass in response to the second self-test signal pattern, and determining a sensitivity of the MEMS accelerometer based on the first received signal and the second received signal.

BRIEF DESCRIPTION OF THE DRAWINGS

The above and other features of the present disclosure, its nature, and various advantages will be more apparent upon consideration of the following detailed description, taken in conjunction with the accompanying drawings in which.

DETAILED DESCRIPTION OF THE DRAWINGS

A MEMS accelerometer includes one or more proof masses that are located within a MEMS layer of the MEMS accelerometer. The MEMS layer includes a suspended spring-mass system that is configured to allow movement of the suspended proof masses in response to linear acceleration along a sense axis (e.g., x-axis, y-axis, or z-axis). The movement is sensed such as by capacitive sensing using fixed drive electrodes. MEMS accelerometers typically employ either in-plane sensing (e.g., where the proof masses move along an axis within the MEMS layer relative to drive electrodes within the MEMS layer) or out-of-plane sensing (e.g., where the proof masses rotate out of the MEMS layer about an axis such that portions of the proof masses move relative to drive electrodes located on other layers such as a substrate layer parallel to and below the MEMS layer). Drive electrodes may be configured as differential electrodes, with at least two drive electrodes associated with each proof mass and configured such that the proof mass moves towards one drive electrode and away from the other drive electrode based on the direction of the linear acceleration. Under normal operations, a differential periodic drive signal is applied to the drive electrodes and coupled to the proof mass and functions as a carrier signal. Processing circuitry determines linear acceleration based on the respective capacitances between the proof masses and their associated drive electrodes.

The drive electrodes may be utilized to perform a self-test of the accelerometer. Because the drive electrodes are used for the self-test, the self-test procedure may accurately capture information about the actual operation of the MEMS accelerometer, including any deviations from expected operation and/or changes in operation over time. In this manner, the self-test measurements correspond to the actual mechanical and electrical response of the proof masses, drive electrodes, and processing circuitry. The self-test procedure is executed at suitable times during the functional lifetime of the accelerometer. An initial self-test may be run during manufacturing, and may be compared to other self-test procedures (e.g., external testing during manufacturing QC that applies known forces to the accelerometer) to set a baseline for the on-chip self-test procedures utilizing the self-test electrodes. The on-chip self-testing may then be performed throughout the MEMS accelerometer life cycle, such as at device startup, periodically during operation, after sensing of high-gee forces or shocks, or during extended periods of relative inactivity.

The self-test signals applied by the drive electrodes are selected as differential signals but with a duty cycle that varies from a typical 50% duty cycle. In this manner, one of the self-test electrodes applies a periodic signal to the proof mass that has a duty cycle greater than 50%, while the other self-test electrode applies a differential periodic signal to the proof mass that has a duty cycle of less than 50%. Based on the respective duty cycles, the respective signals applied to the proof mass via the drive electrodes have different effective DC voltages, with the voltage of the first (>50% duty cycle) signal being greater than the voltage of the second (<50% duty cycle) signal. Based on the respective voltages of the applied self-test signals and the voltage of the proof mass, an electrostatic force is created that moves the proof mass towards the higher-voltage drive electrode and away from the lower-voltage drive electrode. The self-test procedure may be repeated, with the respective duty cycles applied by the first and second drive electrodes switched to cause the proof mass to move in the opposite direction. During each portion of the self-test, the accelerometer output (e.g., based on the changes in capacitance due to the movement of the proof mass in response to applied electrostatic forces) is measured. These outputs are used to determine the sensitivity of the MEMS accelerometer to the known applied forces, which in turn may be used for compensation of measured linear accelerations, to identify errors, to generate warnings, and/or to modify the operation of the MEMS accelerometer or other associated sensors and circuitry.

In some embodiments, an additional set of self-test signals having different respective duty cycles may be applied after the initial application of self-test signals. Applying a second set of self-test signals with duty cycles different from the first set of self-test signals (i.e., with both sets of self-test signals having duty cycles of less than and greater than 50%) may provide for cancellation of any residual voltage effects on the MEMS accelerometer (e.g., on the proof mass). In some instances, a residual voltage on the proof mass and/or electrodes may change over time during the operational life of the MEMS accelerometer, which in turn may change the response of the proof mass to the applied self-test signals. Applying a second set of self-test signals having different effective DC voltages (e.g., based on the different duty cycles of the signals) results in the effective cancellation of terms related to the residual voltage in calculations of MEMS accelerometer sensitivity.

Figure 1:
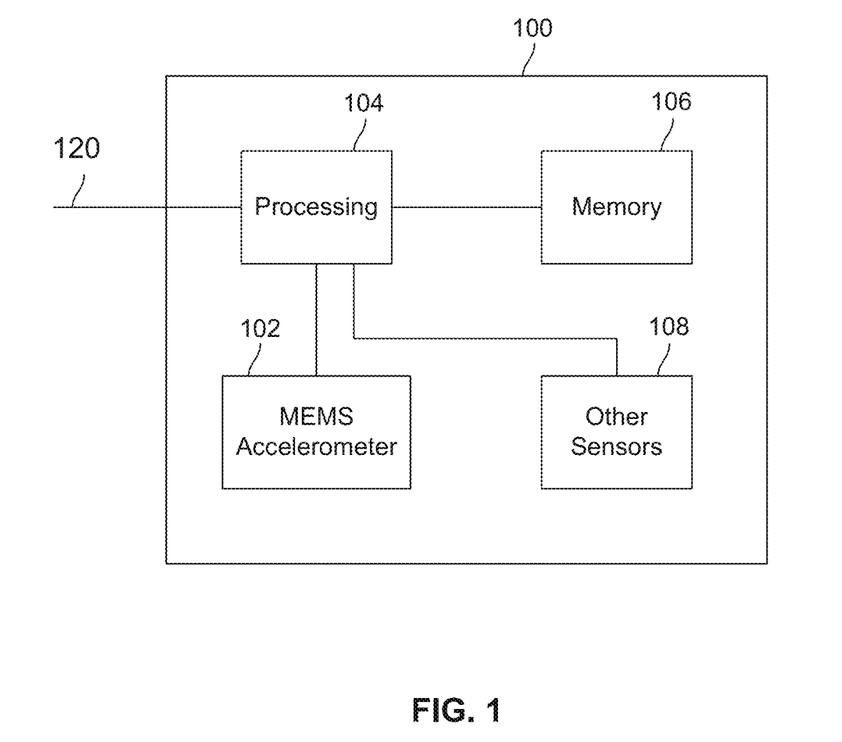
FIG. 1 depicts an exemplary motion sensing system, in accordance with at least some embodiments of the present disclosure.

FIG. 1 depicts an exemplary motion sensing system 100 in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS accelerometer 102 (e.g., a single- or multi-axis accelerometer for measuring linear acceleration along one or more axes) and supporting circuitry, such as processing circuitry 104 and memory 106. In some embodiments, one or more additional sensors 108 (e.g., MEMS gyroscopes, additional MEMS accelerometers, MEMS microphones, MEMS pressure sensors, and a compass) may be included within the motion sensing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion sensing system 100. In some embodiments, processing circuitry 104 may include hardware control logic that may be integrated within a chip of a sensor (e.g., on a substrate or cap of a MEMS accelerometer 102 or other sensor 108, or on an adjacent portion of a chip to the MEMS accelerometer 102 or other sensor 108) to control the operation of the MEMS accelerometer 102 or other sensors 108 and perform aspects of processing for the MEMS accelerometer 102 or other sensors 108. In some embodiments, the MEMS accelerometer 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS accelerometer 102 by interacting with the hardware control logic, and process signals received from MEMS accelerometer 102. The microprocessor may interact with other sensors in a similar manner.

Although in some embodiments (not depicted in FIG. 1), the MEMS accelerometer 102 or other sensors 108 may communicate directly with external circuitry (e.g., via a serial bus or direct connection to sensor outputs and control inputs), in an embodiment the processing circuitry 104 may process data received from the MEMS accelerometer 102 and other sensors 108 and communicate with external components via a communication interface 110 (e.g., an SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS accelerometer 102 and other sensors 108 into appropriate measurement units (e.g., based on settings provided by other computing units communicating over the communication bus 110) and perform more complex processing to determine measurements such as orientation or Euler angles, and, in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS accelerometer 102 or other MEMS sensors 108.

In some embodiments, certain types of information may be determined based on data from multiple MEMS accelerometers 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS accelerometer 102 may include one or more movable proof masses that are configured in a manner that permits the MEMS sensor to measure a desired force (e.g., linear acceleration) along an axis. A self-test procedure may be performed at certain times during the operation of the MEMS accelerometer, such as during startup or periodically during operation (e.g., after a threshold period of time since the measured acceleration exceeds a threshold). The self-test procedure may involve applying multiple periodic signals to each of the drive electrodes, with the periodic signals having different duty cycles and/or peak-to-peak voltages. From the perspective of a proof mass, the overall effect of the applied signals is to cause a movement in the proof mass. The relationship between the known applied signals (e.g., having known peak-to-peak voltages and duty cycles) and the MEMS accelerometer output signal (e.g., based on the value and/or changes to the value of the MEMS accelerometer output signal) may be used to calibrate the MEMS accelerometer (e.g., by modifying aspects of the processing used to generate the MEMS accelerometer output signal).

Figure 2:
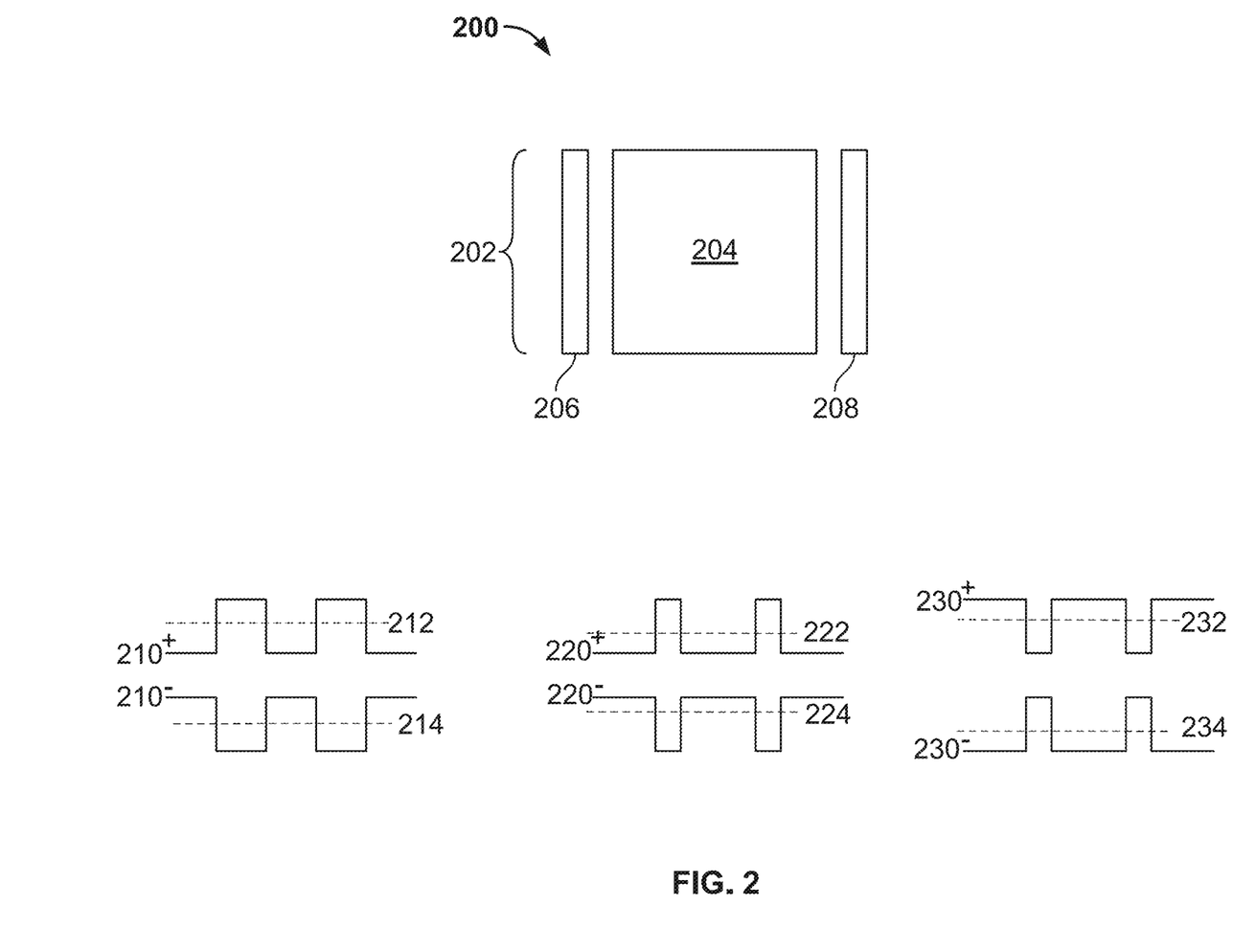
FIG. 2 depicts an exemplary MEMS accelerometer with sensitivity calibration self-test signals, in accordance with some embodiments of the present disclosure.

FIG. 2 depicts an exemplary MEMS accelerometer with sensitivity calibration self-test signals, in accordance with some embodiments of the present disclosure. The exemplary MEMS accelerometer 200 of FIG. 2 is simplified for the purposes of illustration. It will be understood that a MEMS accelerometer as described in the present disclosure may include a variety of suitable MEMS sensor designs, such as designs including multiple proof masses and/or out-of-plane sensing. An illustrative MEMS accelerometer 200 comprises a MEMS layer 202, a substrate layer (e.g., a CMOS substrate layer below the MEMS layer, not depicted), and a cap layer (not depicted), where the cap layer and substrate layer collectively form a hermetically sealed cavity in which movable components of a suspended spring-mass system (e.g., depicted as a simplified proof mass 204 in FIG. 2) are located and able to move. The cavity may have a nominal pressure (e.g., at or near atmospheric pressure, or another suitable pressure for other particular designs).

MEMS layer 202 includes a suspended spring-mass system including proof mass 204, which is suspended from anchors (not depicted in FIG. 2) by interconnected springs and/or masses (not depicted in FIG. 2). The components of the suspended spring mass system are sized and configured in a manner to facilitate movement of the proof mass 204 in response to an inertial force to be measured, e.g., linear acceleration in the direction of the x-axis. The exemplary accelerometer 200 is an in-plane accelerometer, such that stationary drive electrodes 206 and 208 are located within the MEMS layer 202 (e.g., fixedly attached to respective anchors) for sensing in-plane movements of the proof mass 204 along the x-axis. The springs of the suspended spring-mass system (not depicted in FIG. 2) are coupled between the proof mass 204 and other components, and are selectively patterned and positioned such that they are relatively rigid in directions in which it is not desired to measure linear acceleration (e.g., in the embodiment of FIG. 2, in the y-axis direction within the MEMS layer 202 and in the z-axis direction outside of the MEMS layer 202) and relatively flexible in a direction in which linear acceleration is being measured (e.g., in the embodiment of FIG. 2, in the x-axis direction).

In response to an x-axis linear acceleration experienced by the MEMS accelerometer (e.g., due to movement of a device including the MEMS accelerometer at least partially along the x-axis) the proof mass 204 moves linearly in plane within the MEMS layer (e.g., along the x-axis) such that the proof mass 204 moves closer to or farther away from respective drive electrodes 206 and 208, with the direction of the movement based on whether the linear acceleration is in the positive x-axis or negative x-axis, with the degree of movement (e.g., how much the proof mass 204 moves with respect to the respective drive electrodes 206 and 208) based on the magnitude of the acceleration, and with the frequency of changes in movement based on the frequency of change of the underlying movement.

In the exemplary embodiment of FIG. 2, the movement of the proof mass 204 with respect to the drive electrodes 206 and 208 may be sensed using electrostatic sensing. Drive electrodes 206 and 208 are located parallel to the proof mass 204 (e.g., within the MEMS layer 202 adjacent to proof mass 204) to form capacitors with the proof mass 204 (e.g., drive electrode 206 forming a first capacitor on the negative x-side of the proof mass 204 and drive electrode 208 forming a first capacitor on the positive x-side of the proof mass 204). The capacitances may change based on the relative distance between the proof mass 204 and each of the drive electrodes 206 and 208. In the embodiment of FIG. 2, the capacitances are used by processing circuitry in the CMOS layer to determine linear acceleration. While some or all of the processing circuitry may be described as located within a CMOS layer, in some embodiments a substrate may not include active processing components, and may instead simply perform functions such as routing signals to other processing circuitry (e.g., on adjacent components to the MEMS sensor and/or stacked on layers above or below the substrate or cap of the MEMS sensor).

Although the exemplary embodiment of FIG. 2 has been described in reference to an in-plane MEMS accelerometer, such as an x-axis accelerometer, it will be understood that the accelerometers, devices, systems, and methods described herein may be applied to a variety of suitable MEMS accelerometer designs, such as out-of-plane sensing MEMS accelerometers, y-axis and/or z-axis accelerometers, and combinations thereof. For example, in an embodiment of an out-of-plane sensing accelerometer, a proof mass may rotate out of the MEMS plane in response to a z-axis acceleration with a portion of the proof mass rotating towards the substrate and a portion of the proof mass rotating away from the substrate. Drive electrodes may be located on the substrate below the portions of the proof mass and sense the movement of the proof mass in response to linear acceleration (e.g., a first drive electrode located below a first portion of the proof mass located to a first side of an axis of rotation of the proof mass and a second drive electrode located below a second portion of the proof mass located to a second side of the axis of rotation of the proof mass).

In a sense mode for the MEMS accelerometer 200, a differential periodic electrode drive signal with a 50% duty cycle may be applied to the respective drive electrodes 206 and 208, for example, with a first drive signal $210^+$ applied to drive electrode 206 and a second drive signal $210^-$ applied to drive electrode 208. The drive signals $210^+$ and $210^-$ have a peak-to-peak voltage (e.g., 2.5 volts) and at a 50% duty cycle apply to equal effective DC voltages 212 and 214 (e.g., 1.25 volts) to the proof mass 204 via drive electrodes 206 and 208. Proof mass 204 is stationary in response to the drive signals $210^+$ and $210^-$ (i.e., in the absence of linear acceleration). Linear acceleration in the direction of one of the drive electrodes 206 or 208 causes the proof mass 204 to move with respect to the drive electrodes 206 and 208 (i.e., towards one of the drive electrodes 206/208 and away from the other of the drive electrodes 206/208). Linear acceleration is sensed based on capacitance measurements between proof mass 204 and each of the drive electrodes 206 and 208, for example, based on capacitance(s) measured by one or more capacitance-to-voltage converters and further processing by additional processing circuitry such as A/D converters, demodulation circuitry, filters, gain/offset/sensitivity circuitry, etc. (not depicted).

The drive electrodes may also function as self-test electrodes in some embodiments of the present disclosure. In some embodiments, the differential self-test signal applied via the respective proof masses may have a different duty cycle than the normal 50% applied for the sense mass drive signals. For example, a first self-test signal $220^+$ may be applied to drive electrode 206 and a second self-test signal $220^-$ may be applied to drive electrode 208. In an exemplary embodiment of a duty cycle of 25% for first self-test signal $220^+$ and a duty cycle of 75% for second self-test signal $220^-$, the effective DC voltage of the first self-test signal $220^+$ may be 25% of the peak-to-peak voltage (e.g., 0.625 volts for a peak-to-peak voltage of 2.5 volts) and the effective DC voltage of the second self-test signal $220^-$ may be 75% of the peak-to-peak voltage (e.g., 1.875 volts for a peak-to-peak voltage of 2.5 volts). The attractive electrostatic force on the proof mass 204 due to the second self-test signal $220^-$ applied via drive electrode 208 is thus greater than the electrostatic force on the proof mass 204 due to the first self-test signal $220^+$ applied via drive electrode 206, resulting in a movement of proof mass 204 towards drive electrode 208 and away from drive electrode 206.

At a second time after the application of the first self-test signal $220^+$ and the second self-test signal $220^-$, a third self-test signal $230^+$ may be applied to drive electrode 206 and a fourth self-test signal $230^-$ may be applied to drive electrode 208. The attractive electrostatic force on the proof mass 204 due to the third self-test signal $230^+$ applied via drive electrode 206 is greater than the electrostatic force on the proof mass 204 due to the fourth self-test signal $230^-$ applied via drive electrode 208, resulting in a movement of proof mass 204 towards drive electrode 206 and away from drive electrode 208. In the exemplary embodiment of FIG. 2, the third self-test signal $230^+$ applied to drive electrode 206 may have the same signal pattern (e.g., peak-to-peak voltage and duty cycle) that was previously applied as second self-test signal $220^-$ to drive electrode 208, and the fourth self-test signal $230^-$ applied to drive electrode 208 may have the same signal pattern (e.g., peak-to-peak voltage and duty cycle) that was previously applied as first self-test signal $220^+$ to drive electrode 206, such that signals 220 and 230 result in similar forces applied to the proof mass 204 in opposite directions. The resulting movements of the proof mass due to the self-test signals may be sensed via the same sense path used to sense linear acceleration.

In some embodiments, the respective peak-to-peak voltages and duty cycles of different self-test signals may not be equivalent as is depicted in FIG. 2, such that the applied forces on a proof mass due to different self-test signals are not equivalent. For example, the peak-to-peak voltages and/or duty cycle may be varied to apply a variety of different effective DC voltage shifts to proof masses via drive electrodes (i.e., to cause unbalanced electrostatic forces to cause movement of the proof mass). For example, multiple effective DC voltages may be applied to test proof mass movement in a single direction in response to different magnitudes of applied forces. The output of the accelerometer sense circuitry to the different applied forces may be tracked over time and analyzed to track and identify conditions related to changes in accelerometer performance over time. By utilizing the same drive electrodes and sense circuitry that are used for measurement of linear acceleration, the self-test may be performed throughout the life of the accelerometer (e.g., at device startup, periodically, or during periods of relative inactivity). Over time, patterns of self-test data (e.g., responses to different applied self-test signals) may be identified as corresponding to particular root causes such as mechanical wear, electrode sensitivity, electrical component drift, etc. This information may be used to apply compensation to accelerometer signals (e.g., by modifying the operation of filters and/or signal processing such as gain/offset/sensitivity circuitry) or to identify sensor error conditions and warnings.

Figure 3A:
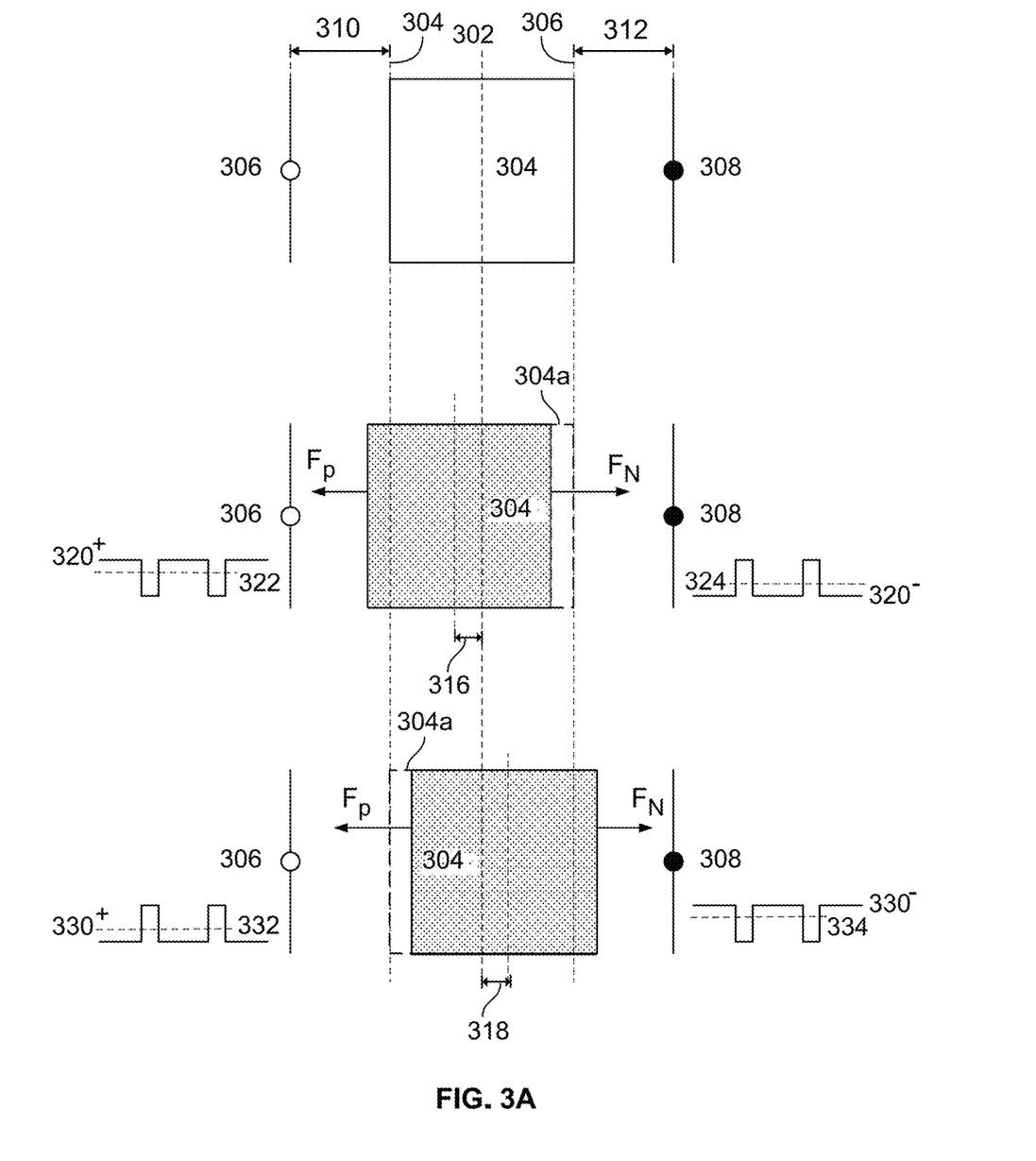
FIG. 3A depicts exemplary movements of a proof mass of a MEMS accelerometer in response to self-test signals, in accordance with at least some embodiments of the present disclosure.

FIG. 3A depicts exemplary movements of a proof mass of a MEMS accelerometer in response to self-test signals, in accordance with at least some embodiments of the present disclosure. A center line 302 corresponds to a midpoint between a first drive electrode 306 and a second drive electrode 308. A proof mass 304 is located between the drive electrodes 306 and 308, and in the exemplary embodiment of FIG. 3A, has its center of mass located along the center line 302 when the proof mass 304 is at rest (e.g., including when differential drive signals having a 50% duty cycle are applied to drive electrodes 306 and 308). In the exemplary embodiment of FIG. 3A, a first gap 310 between proof mass 304 and drive electrode 306 is equal to a second gap 312 between proof mass 304 and drive electrode 308 while the proof mass is at rest (i.e., in the absence of a sensed linear acceleration or self-test signals applied via the drive electrodes).

As depicted in FIG. 3A, a first self-test signal 320⁺ having a first equivalent DC voltage 322 may be applied to drive electrode 306, and a second self-test signal 320⁻ having a second equivalent DC voltage 324 may be applied to drive electrode 308. In the exemplary embodiment of FIG. 3A, the first self-test signal 320⁺ and second self-test signal 320⁻ may be differential signals with the same peak-to-peak voltage and complementary duty cycles (e.g., first self-test signal 320⁺ may have a duty cycle of X % and second self-test signal 320⁻ may have a duty cycle of 100%–X %). As a result, a net electrostatic force is applied to the proof mass 304 that causes proof mass 304 to be displaced from its initial position 304a by a displacement 316. The accelerometer output is measured based on the respective capacitances between drive electrode 306 and proof mass 304 (e.g., an increased capacitance based on displacement 316) and between drive electrode 308 and proof mass 304 (e.g., a decreased capacitance based on displacement 316).

Also as depicted in FIG. 3A, a third self-test signal 330⁺ having a third equivalent DC voltage 332 may be applied to drive electrode 306 and a fourth self-test signal 330⁻ having a fourth equivalent DC voltage 334 may be applied to drive electrode 308. In the exemplary embodiment of FIG. 3A, the third self-test signal 330⁺ and fourth self-test signal 330⁻ may be differential signals with the same peak-to-peak voltage and complementary duty cycles (e.g., third self-test signal 330⁺ may have a duty cycle of X % and fourth self-test signal 330⁻ may have a duty cycle of 100%–X %). As a result, a net electrostatic force is applied to the proof mass 304 that causes proof mass 304 to be displaced from its initial position 304a by a displacement 318. The accelerometer output is measured based on the respective capacitances between drive electrode 306 and proof mass 304 (e.g., a decreased capacitance based on displacement 318) and between drive electrode 308 and proof mass 304 (e.g., an increased capacitance based on displacement 318).

In the exemplary embodiment of FIG. 3A, first self-test signal 320⁺ and fourth self-test signal 330⁻ may have the same peak-to-peak voltage and duty cycle, and thus first equivalent DC voltage 322 may be the same voltage as fourth equivalent DC voltage 334. Similarly, second self-test signal 320⁻ and third self-test signal 330⁺ may have the same peak-to-peak voltage and duty cycle, and thus second equivalent DC voltage 324 may be the same voltage as third equivalent DC voltage 332. Accordingly, displacement 316 should be equal and opposite to displacement 318, causing proof mass 304 to be displaced from its initial position 304a. In the embodiment of FIG. 3A, where proof mass 304 has its center of mass at center line 302 and first gap 310 and second gap 312 are equal when the proof mass 304 is at rest, the resulting accelerometer output values in response to displacements 316 and 318 should have equal magnitudes and opposite signs.

Sensitivity may be measured based on the changes in accelerometer output (e.g., based on changes in sensed capacitance) in response to the respective displacements. In general, sensitivity can be computed as the average capacitance shift in response to a positive and negative displacement as follows:

$$S = \frac{\Delta C_1 - \Delta C_2}{2} = \frac{1}{2}\left(\left(\frac{\epsilon_0 A}{g_1 - x_p} - \frac{\epsilon_0 A}{g_2 + x_p}\right) - \left(\frac{\epsilon_0 A}{g_1 - x_n} - \frac{\epsilon_0 A}{g_2 + x_n}\right)\right) \quad (1)$$

where:
ΔC=change in capacitance
$\epsilon_0$=[vacuum permittivity=8.85e-12];
A=[Area of drive electrodes];
$g_1$=a first drive electrode to proof mass gap (e.g., gap 310);
$g_2$=a second drive electrode to proof mass gap (e.g., gap 312);
$x_p$=a positive displacement (e.g., displacement 316); and
$x_n$=a negative displacement (e.g., displacement 318).

In an ideal case where the gaps between the drive electrodes and the proof mass are equal to a gap value $g_0$ such that $g_1=g_2=g_0$, the above calculation of sensitivity may be simplified as follows:

$$S = \frac{C_0}{g_0}(x_p - x_n) \quad (2)$$

where:
$C_0$=capacitance between drive electrode and proof mass

In the case of an applied acceleration during a manufacturing quality test procedure, standardized accelerations (e.g., +1 gee and −1 gee) are applied to the MEMS accelerometer and the outputs (e.g., values proportional to sensed capacitances) are output. In this ideal case in which the proof mass to drive electrode gaps are equal and a fixed acceleration is applied in both directions, both the positive displacement $x_p$ and negative displacement $x_n$ should have an equal magnitude in response to the displacement $x_{acc}$ due to the applied acceleration. Thus, the above equation (2) simplifies to the following:

$$S_{acc,ideal} = 2\frac{C_0}{g_0}x_{acc} \quad (3)$$

During self-test as described herein, the sensitivity can be determined based on the measured MEMS accelerometer outputs and the applied equivalent DC voltages. The electrostatic forces generated on the proof mass depend on the square wave rms value of the drive electrodes with respect to the proof mass. For example, under ideal conditions (i.e., where gap 310 between the proof mass 304 and first drive electrode 306 is equal to gap 312 between the proof mass 304 and second drive electrode 308), the respective positive displacement $x_p$ and negative displacement $x_n$ correspond to the applied electrostatic forces caused by the equivalent DC voltages as follows:

$$x_p = \frac{F_p - F_n}{k} = \frac{0.5\frac{C_0}{g_0}(V_1)^2 - 0.5\frac{C_0}{g_0}(V_2)^2}{k} = \frac{0.5}{k}\frac{C_0}{g_0}(V_1^2 - V_2^2) \quad (4)$$

$$x_n = \frac{F_p - F_n}{k} = \frac{0.5\frac{C_0}{g_0}(V_2)^2 - 0.5\frac{C_0}{g_0}(V_1)^2}{k} = -\frac{0.5}{k}\frac{C_0}{g_0}(V_1^2 - V_2^2) \quad (5)$$

where:
$F_p$=the force of displacement on the proof mass in a first direction (arbitrarily assigned as positive, for example, towards first drive electrode 306);
$F_n$=the force of displacement on the proof mass in a second direction (arbitrarily assigned as negative, for example, towards the second drive electrode 308);
$V_1$=a first rms voltage (e.g., a square wave rms voltage) based on a first equivalent signal applied to the drive electrodes at respective times (e.g., signals having a common peak-to-peak voltage and duty cycle applied to the first drive electrode 306 as first self-test signal 320$^+$ and to the second drive electrode 308 as fourth self-test signal 330$^-$) and the proof mass voltage; and
$V_2$=a second rms voltage (e.g., a square wave rms voltage) based on a second equivalent signal applied to the drive electrodes at respective times (e.g., signals having a common peak-to-peak voltage and duty cycle applied to the second drive electrode 308 as second self-test signal 320$^-$ and to the first drive electrode 306 as third self-test signal 330$^+$) and the proof mass voltage.

Plugging these displacement equations (4) and (5) into equation (2) (i.e., relationship between sensitivity and respective positive and negative displacements) yields the following equation for the relationship between the applied signals and the sensitivity as measured from electrostatic forces created by those signals:

$$S_{el,ideal} = \frac{1}{k}\left(\frac{C_0}{g_0}\right)^2 (V_1^2 - V_2^2) \quad (6)$$

Accelerometer outputs that do not correspond to the expected values based on the applied self-test signals may be indicative of non-ideal sensitivity of the MEMS accelerometer. For example, the accelerometer outputs may indicate that the proof mass is unbalanced (e.g., the center of mass of the proof mass is not located at the center line), that the sensitivity of the MEMS accelerometer has changed due to wear or other causes (e.g., as indicated by changes to accelerometer outputs over time in response to the same applied self-test signals), or that one or more components of the MEMS accelerometer are likely damaged (e.g., as indicated by non-linear or disproportionate responses to applied self-test signals). Where possible, compensation may be performed by changing filter parameters, scaling values, or other similar values. Depending on the severity of the self-test response, errors or warnings may be generated.

Figure 3B:
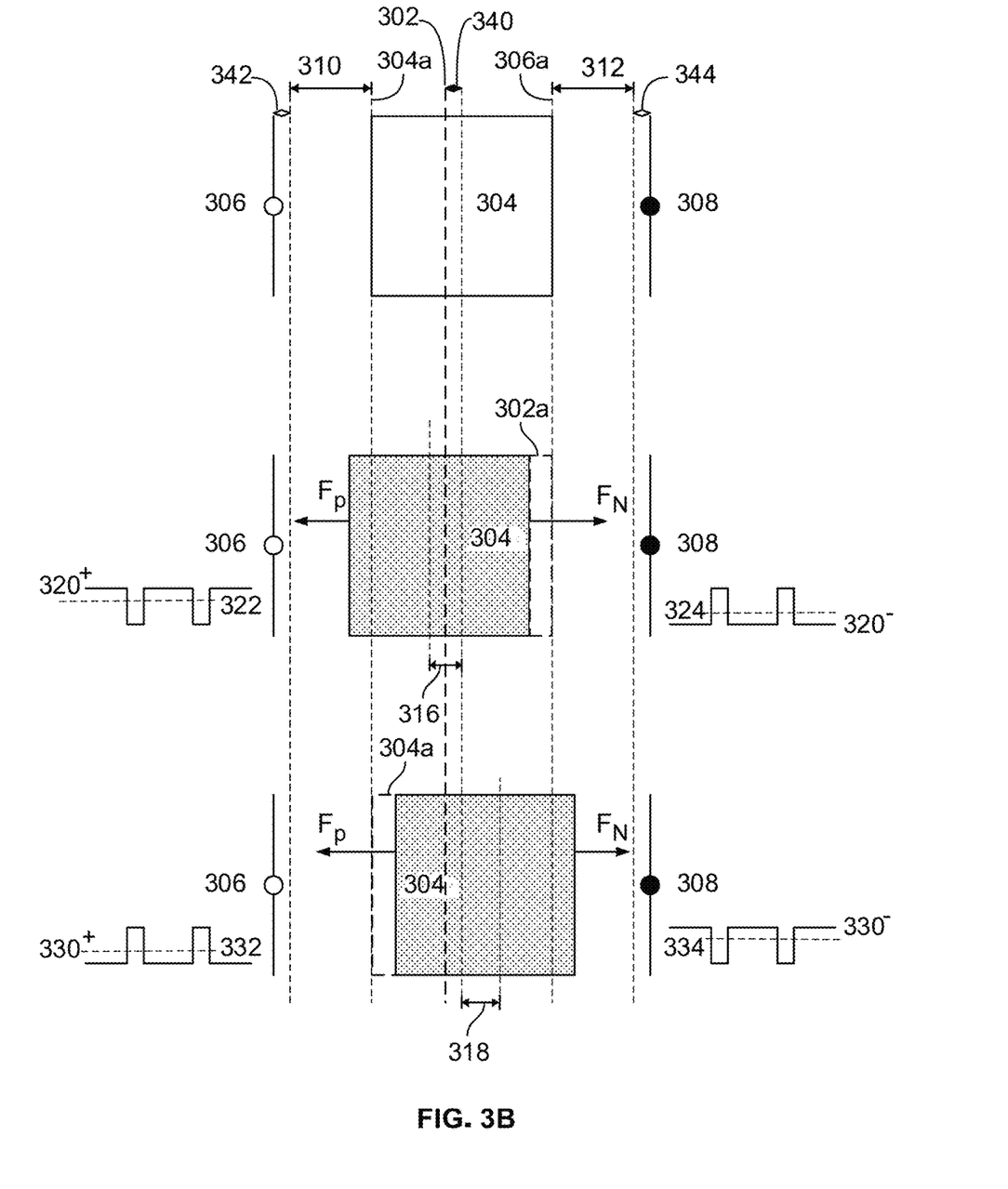
FIG. 3B depicts exemplary movements of an unbalanced proof mass of a MEMS accelerometer in response to self-test signals, in accordance with at least some embodiments of the present disclosure.

FIG. 3B depicts exemplary movements of an unbalanced proof mass of a MEMS accelerometer in response to self-test signals, in accordance with at least some embodiments of the present disclosure. The configuration of the proof mass 304 and drive electrodes 306 and 308 depicted in FIG. 3B is similar to the configuration of like-numbered components in FIG. 3A. In addition, the applied self-test signals (i.e., self-test signals 320$^+$, 320$^-$, 330$^+$, and 330$^-$), equivalent DC voltages (i.e., equivalent DC voltages 322, 324, 332, and 334), and displacements in response to the self-test signals (i.e., displacements 316 and 318) are similar to like-numbered items in FIG. 3A.

In the exemplary embodiment of FIG. 3B, multiple possible deviations from the ideal case of FIG. 3A (e.g., with ideal equal gaps between the proof mass 304 and respective drive electrodes 306 and 308, and with those gaps corresponding to the designed gaps) are depicted as differential gap 340 and common mode gaps 342 and 344. The differential gap 340 corresponds to a shift of the at-rest position of the proof mass 304 from its designed position equidistant between the drive electrodes 306 and 308 (i.e., with the center of mass of proof mass 304 located at the center line 302) by a distance corresponding to differential gap 340. In the exemplary depiction of FIG. 3B, the differential gap 340 causes the at-rest proof mass 304 to be located closer to drive electrode 308 than to drive electrode 306. As a result, the first gap 310 and second gap 312 are no longer equal.

The common mode gap deviations 342 and 344 represent deviations from the designed gaps for the MEMS accelerometer (e.g., as depicted by gaps 310 and 312 in FIG. 3A) that are not attributable to the differential gap (i.e., gaps of common/equal distance with respect to proof mass 304). A MEMS accelerometer may have one or both of differential and common mode gap deviations for a variety of reasons, such as manufacturing tolerances, stresses imparted on the MEMS accelerometer during packaging within a chip or end-use device, or standard wear incurred over the usable lifetime of the device. When compared to the ideal situation depicted in FIG. 3A, in which both of the gaps 310 and 312 are equal to a designed gap "$g_0$", the gaps 310 (i.e., "$g_1$") and 312 (i.e., "$g_2$") may be represented as follows:

$$g_1 = g_0 + \Delta g_{cm} + \Delta g_d$$

$$g_2 = g_0 + \Delta g_{cm} - \Delta g_d \quad (7)$$

where:
$g_1$=the gap between the proof mass (e.g., proof mass 304) and a first drive electrode (e.g., drive electrode 306);
$g_2$=the gap between the proof mass (e.g., proof mass 304) and a second drive electrode (e.g., drive electrode 308);
$g_0$=designed gap between the proof mass (e.g., proof mass 304) and each of the first and second drive electrodes (e.g., drive electrodes 306 and 308);

$\Delta g_d$=differential gap deviation (e.g., differential gap deviation 340); and $\Delta g_{cm}$=common mode gap deviation (e.g., common mode gap deviations 342 and 344).

Plugging the equations of (7) for $g_1$ and $g_2$ into equation (1) results in the effective cancellation of the terms differential gap deviation $\Delta g_d$, such that in the case of an applied acceleration during manufacturing quality test procedure, the sensitivity to the applied acceleration is partially dependent on the common mode gap deviation (e.g., common mode gap deviations 342 and 344) as follows:

$$S_{acc,real} = 2\frac{C_0}{g_0}x_{acc} \cdot \frac{1}{1+2\frac{\Delta g_{cm}}{g_0}} \qquad (8)$$

During self-test as described herein, the sensitivity is determined based on the measured MEMS accelerometer outputs and the applied equivalent DC voltages. The electrostatic forces generated on the proof mass depend on the square wave rms value of the drive electrodes with respect to the proof mass. For example, under conditions with a differential gap deviation 340 and common mode gap deviations 342 and 344, the respective positive displacement $x_p$ and negative displacement $x_n$ correspond to the applied electrostatic forces caused by the equivalent DC voltages as follows:

$$x_p = \qquad (9)$$
$$\frac{0.5}{k}\frac{C_0}{g_0} \cdot \frac{1}{1+4\frac{\Delta g_{cm}}{g_0}} \cdot \left(\left(1+2\frac{\Delta g_{cm}}{g_0}\right) \cdot (V_1^2 - V_2^2) - 2\frac{\Delta g_d}{g_0} \cdot (V_1^2 + V_2^2)\right)$$

$$x_n = -\frac{0.5}{k} \qquad (10)$$
$$\frac{C_0}{g_0} \cdot \frac{1}{1+4\frac{\Delta g_{cm}}{g_0}} \cdot \left(\left(1+2\frac{\Delta g_{cm}}{g_0}\right) \cdot (V_1^2 - V_2^2) + 2\frac{\Delta g_d}{g_0} \cdot (V_1^2 + V_2^2)\right)$$

Plugging these displacement equations (9) and (10) into equation (2) (i.e., relationship between sensitivity and respective positive and negative displacements) yields the following equation for the relationship between the applied signals and the sensitivity as measured from electrostatic forces created by those signals in the presence of differential and/or common mode gap deviations (e.g., with cancellation of the differential gap deviations for reasonable expected differential gap deviations):

$$S_{el,real} = \frac{1}{k}\left(\frac{C_0}{g_0}\right)^2 \frac{(V_1^2 - V_2^2)}{1+4\frac{\Delta g_{cm}}{g_0}} \qquad (11)$$

Accordingly, the self-test procedures described herein can determine sensitivity for the MEMS accelerometer even in the presence of gap deviations. The sensitivity may then be used for calibration the MEMS accelerometer (e.g., by applying compensation to measured accelerometer outputs), identification of errors and/or warnings, and data analysis during the lifetime of the MEMS accelerometer.

In some embodiments, a sensitivity error (e.g., a sensitivity error percentage) due to gap deviations may be determined based on a comparison of the ideal sensitivity to the real sensitivity (i.e., actual sensitivity with gap deviations) as follows:

$$S_{\%err} = \frac{(S_{real} - S_{ideal})}{S_{ideal}} \cdot 100 \qquad (12)$$

Considering the equations (3) and (8) above, the percentage sensitivity error due to gap deviations as measured from an applied linear velocity (e.g., +1 gee or −1 gee) can be approximated as follows:

$$S_{\%err,acc} = \frac{\left(2\frac{C_0}{g_0}x_{acc} \cdot \frac{1}{1+2\frac{\Delta g_{cm}}{g_0}} - 2\frac{C_0}{g_0}x_{acc}\right)}{2\frac{C_0}{g_0}x_{acc}} \cdot 100 \approx -2\frac{\Delta g_{cm}}{g_0} \cdot 100 \qquad (13)$$

Similarly, the equations (6) and (11) above approximate the percentage sensitivity error due to gap deviations as measured with an applied electrostatic displacement due to self-test signals:

$$S_{\%err,el} = \qquad (14)$$
$$\frac{\left(\frac{1}{k}\left(\frac{C_0}{g_0}\right)^2 \frac{(V_1^2 - V_2^2)}{1+4\frac{\Delta g_{cm}}{g_0}} - \frac{1}{k}\left(\frac{C_0}{g_0}\right)^2 (V_1^2 - V_2^2)\right)}{\frac{1}{k}\left(\frac{C_0}{g_0}\right)^2 (V_1^2 - V_2^2)} \cdot 100 \approx -4\frac{\Delta g_{cm}}{g_0} \cdot 100$$

As can be seen from the approximations of equations (13) and (14), the sensitivity error detected by electrostatic forces is the same as that detected by the application of an external linear acceleration, with the exception of a fixed factor of 2 between the two equations. Accordingly, measurements from the MEMS accelerometer in response to the application of self-test signals may be utilized along with prior ideal measurements to identify a percentage sensitivity error due to deviations from the designed proof mass and drive electrode gaps.

The sensitivity determinations described herein may be based on applied self-test signals having known signal patterns (e.g., peak-to-peak voltages and duty cycles) and expected electrostatic forces imparted on a proof mass associated with the drive electrodes that are used to apply the self-test signal. Those expected electrostatic forces depend in part on voltages of the proof mass and drive electrodes. In some instances, a residual charging voltage may build upon the proof mass that may change the electrostatic force applied to the proof mass by the same self-test signals. In some embodiments, the residual voltage of the proof mass may be measured (e.g., by auxiliary electrodes) prior to applying the self-test signals, such that either the self-test signals (e.g., the peak-to-peak voltage and/or duty cycle) are modified and/or the determination of sensitivity is modified based on the measured residual voltage. In some embodiments, a discharge procedure may be applied to the proof mass prior to application of a voltage to the proof mass, to ensure that the voltage of the proof mass corresponds to the applied voltage.

In some embodiments, multiple self-test signal patterns (e.g., including different peak-to-peak voltages and/or complementary duty cycles) may be applied to the drive electrodes to substantially remove the effect of a charging voltage on the MEMS accelerometer. For example, a residual charging may be considered as a common mode voltage that is uniform across all of the drive electrodes. Accordingly, for a first self-test signal pattern having a first duty cycle $D_A$ associated with a first peak-to-peak voltage $V_A$ and a complementary first duty cycle $1-D_A$, an approximation (e.g., with non-variable terms disregarded) of the applied force can be determined as $V_1^2-V_2^2$ as follows:

$$V_1^2 = (V_A - V_{PM} + V_{CH})^2 \cdot D_A + (-V_{PM} + V_{CH})^2 \cdot (1 - D_A) \quad (15)$$

$$V_2^2 = (V_A - V_{PM} + V_{CH})^2 \cdot (1 - D_A) + (-V_{PM} + V_{CH})^2 \cdot D_A \quad (16)$$

$$V_1^2 - V_2^2 = V_A(2D_A - 1) \cdot (V_A - 2V_{PM} + 2V_{CH}) \quad (17)$$

where:
$V_A$=first peak-to-peak voltage;
$V_{PM}$=baseline proof mass voltage;
$V_{PM}$=charge-induced voltage; and
$D_A$=first duty cycle.

Similarly, for a second self-test signal pattern having a second duty cycle $D_B$ associated with a second peak-to-peak voltage $V_B$ and a complementary first duty cycle $1-D_B$, an approximation (e.g., with non-variable terms disregarded) of the applied force can be determined as $V_3^2-V_4^2$ as follows:

$$V_3^2 = (V_2 - V_{PM} + V_{CH})^2 \cdot D_B + (-V_{PM} + V_{CH})^2 \cdot (1 - D_B) \quad (18)$$

$$V_4^2 = (V_2 - V_{PM} + V_{CH})^2 \cdot (1 - D_B) + (-V_{PM} + V_{CH})^2 \cdot D_B \quad (19)$$

$$V_3^2 - V_4^2 = V_B(2D_B - 1) \cdot (V_B - 2V_{PM} + 2V_{CH}) \quad (20)$$

where:
$V_B$=second peak-to-peak voltage; and
$D_B$=second duty cycle.

An approximation of a resulting sensitivity signal as determined from the first and second peak-to-peak voltages and duty cycles may be determined from as follows:

$$\text{Resulting signal} \propto V_{out,eq} = V_1^2 - V_2^2 - (V_3^2 - V_4^2) \quad (21)$$

where:
$V_{out,eq}$=equivalent voltage

Because this signal may vary based on the underlying charging term $V_{ch}$, it is desirable to eliminate the dependency of the output on the charging voltage $V_{ch}$. In one embodiment, this is accomplished by nulling the first derivative of $V_{out,eg}$ over $V_{ch}$ as follows:

$$\frac{\partial}{\partial V_{CH}}(V_1^2 - V_2^2 - (V_3^2 - V_4^2)) = 0 = 2V_A \cdot (2D_A - 1) - 2V_B \cdot (2D_B - 1) \quad (23)$$

For the above equation to be satisfied, it is necessary that the signal patterns for the self-test signals be selected such that the first duty cycle ($D_A$) and second duty cycle ($D_B$) have different values, and the first peak-to-peak voltage ($V_A$) and the second peak-to-peak voltage ($V_B$) have different values. Once appropriate values of $V_A$, $V_B$, $D_A$, and $D_B$ are selected to satisfy the above equation (23) (i.e., such that $2V_A \cdot (2D_A-1)-2V_B \cdot (2D_B-1)$ is equal to zero), the sensitivity and sensitivity errors may be determined from the applied self-test signals as described herein.

Figure 4A:
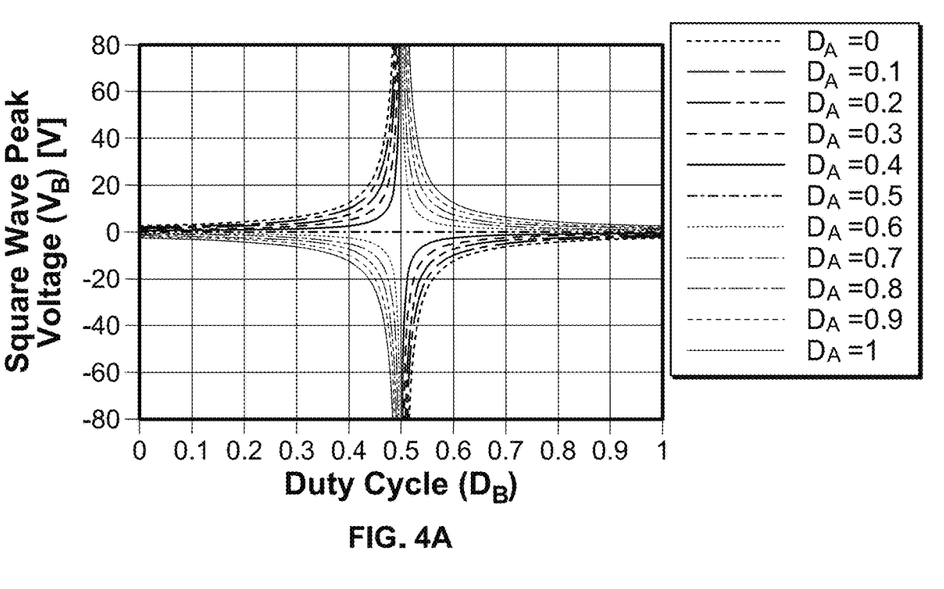
FIG. 4A depicts exemplary relationships between applied voltages and duty cycles for multiple exemplary self-test signals, in accordance with at least some embodiments of the present disclosure.
Figure 4B:
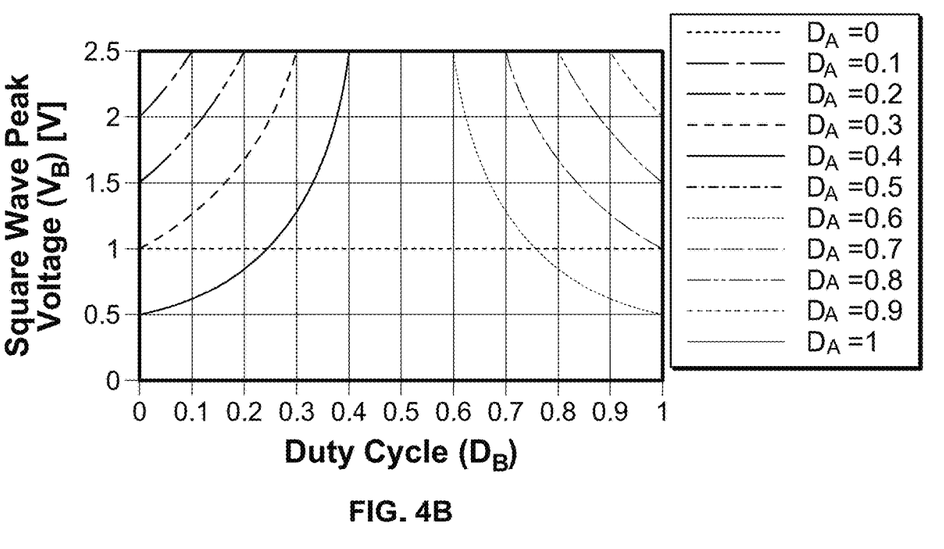
FIG. 4B also depicts exemplary relationships between applied voltages and duty cycles for multiple exemplary self-test signals, in accordance with at least some embodiments of the present disclosure.

FIG. 4A depicts exemplary relationships between applied voltages and duty cycles for multiple exemplary self-test signals, in accordance with at least some embodiments of the present disclosure, while FIG. 4B depicts a close-up view of a portion of FIG. 4A. As described above, respective values for $D_A$, $V_A$, $D_B$, and $V_B$ may be determined by selecting appropriate values and solving for the above equation (23), for example, as follows:

$$V_B = \frac{V_A \cdot (2D_A - 1)}{2D_B - 1} \quad (24)$$

This relationship is depicted, for example, in FIGS. 4A and 4B. The abscissae of FIGS. 4A and 4B and are in units of duty cycle, for example, with 0.1 corresponding to a 10% duty and 0.9 corresponding to a 90% duty cycle. The ordinate of FIGS. 4A and 4B is in units of square wave peak voltage. Respective curves are depicted for each of a plurality of first duty cycles $D_A$. A second duty cycle $D_B$ and a second peak-to-peak voltage $V_B$ may be determined by selecting the appropriate curve corresponding to the first duty cycle $D_A$ (e.g., any of $D_A$=0, 0.1, 0.2, 0.3, 0.4, 0.5, 0.6, 0.7, 0.8, 0.9, 1 in the embodiment of FIGS. 4A and 4B) and choosing among available values for the second duty cycle $D_B$ and second peak-to-peak voltage $V_B$. For example, with reference to the zoomed in portion of FIG. 4A depicted in FIG. 4B (i.e., limited to the portion of FIG. 4A in which the second peak-to-peak voltage $V_B$ of 0-2.5V is suitable for a typical MEMS accelerometer), if the first duty cycle is 0.3 (and first complementary duty cycle is 0.7), the available range for the second duty cycle $D_B$ may be a value approaching zero (e.g., at second voltage $V_B$ of approximately 1V) to a value approaching 0.3 (e.g., corresponding to a second voltage $V_B$ of approximately 2.5V). For example at a second duty cycle $D_B$ of 0.1 an associated value for second voltage $V_B$ is approximately 1.2V while at a second duty cycle $D_B$ of 0.2 an associated value for second voltage $V_B$ is approximately 1.7V.

Once suitable values for $D_A$, $V_A$, $D_B$, and $V_B$ are selected, the sensitivity and/or sensitivity error may be determined as described herein, for example, by first applying signal patterns based on $D_A$ and $V_A$ to drive electrodes associated with a proof mass (e.g., by applying complementary signals based on $D_A$ and $V_A$ to the drive electrodes to cause displacement in both the positive and negative directions of linear acceleration for the proof mass) and measuring the responses, followed by repeating the same procedure based on $D_B$ and $V_B$ (e.g., by applying complementary signals based on $D_B$ and $V_{AB}$ to the drive electrodes to cause displacement in both the positive and negative directions of linear acceleration for the proof mass). If the values of $D_A$, $V_A$, $D_B$, and $V_B$ are properly selected, the equivalent voltage of equation (21) is no longer dependent on the charging voltage, as is demonstrated by substitution of equation (24) into equation 21:

$$V_{OUT,eq} = V_1^2 - V_2^2 - (V_3^2 - V_4^2) = 2V_A^2(D_B - D_A) \cdot \frac{2D_A - 1}{2D_B - 1} \quad (25)$$

The sensitivity error, which is based on $V_{OUT,eq}$, thus will not be dependent on the charging voltage either:

$$S_{\%err,el} = \quad (26)$$
$$\frac{\left(\frac{1}{k}\left(\frac{C_0}{g_0}\right)^2 \frac{V_{OOUT,eq}}{1 + 4\frac{\Delta g_{cm}}{g_0}} - \frac{1}{k}\left(\frac{C_0}{g_0}\right)^2 V_{OUT,eq}\right)}{\frac{1}{k}\left(\frac{C_0}{g_0}\right)^2 V_{OUT,eq}} \cdot 100 \approx -4\frac{\Delta g_{cm}}{g_0} \cdot 100$$

Figure 4C:
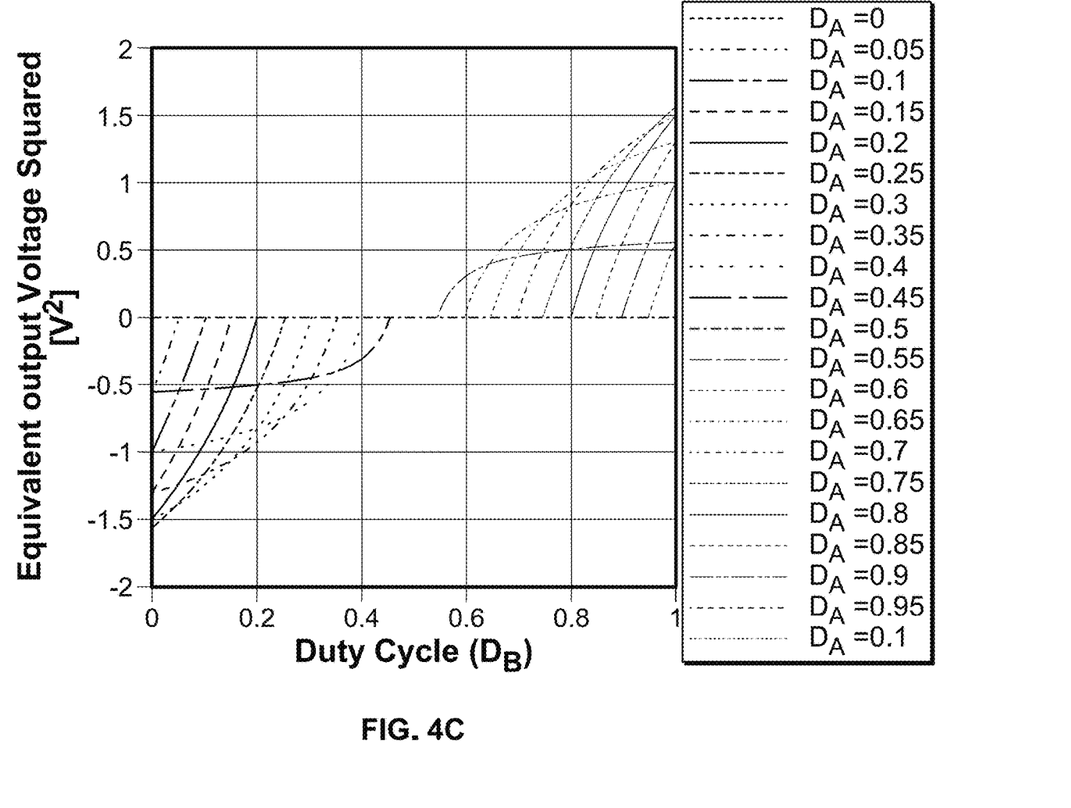
FIG. 4C depicts exemplary relationships between an equivalent output voltage and duty cycle, in accordance with at least some embodiments of the present disclosure.

FIG. 4C depicts exemplary relationships between an equivalent output voltage and duty cycle in accordance with at least some embodiments of the present disclosure. As depicted in FIG. 4C, the abscissae are in units of duty cycle and correspond to the second duty cycle $D_B$, ranging from 0 (0% duty cycle) to 1 (100% duty cycle). The ordinate of FIG. 4C is in units of equivalent output voltage. A set of curves correspond to possible values of duty cycle for first duty cycle $D_A$ in 0.05 or 5% increments. Equivalent voltage values may thus be determined based on the respective duty cycles as depicted in FIG. 4C.

Figure 5:
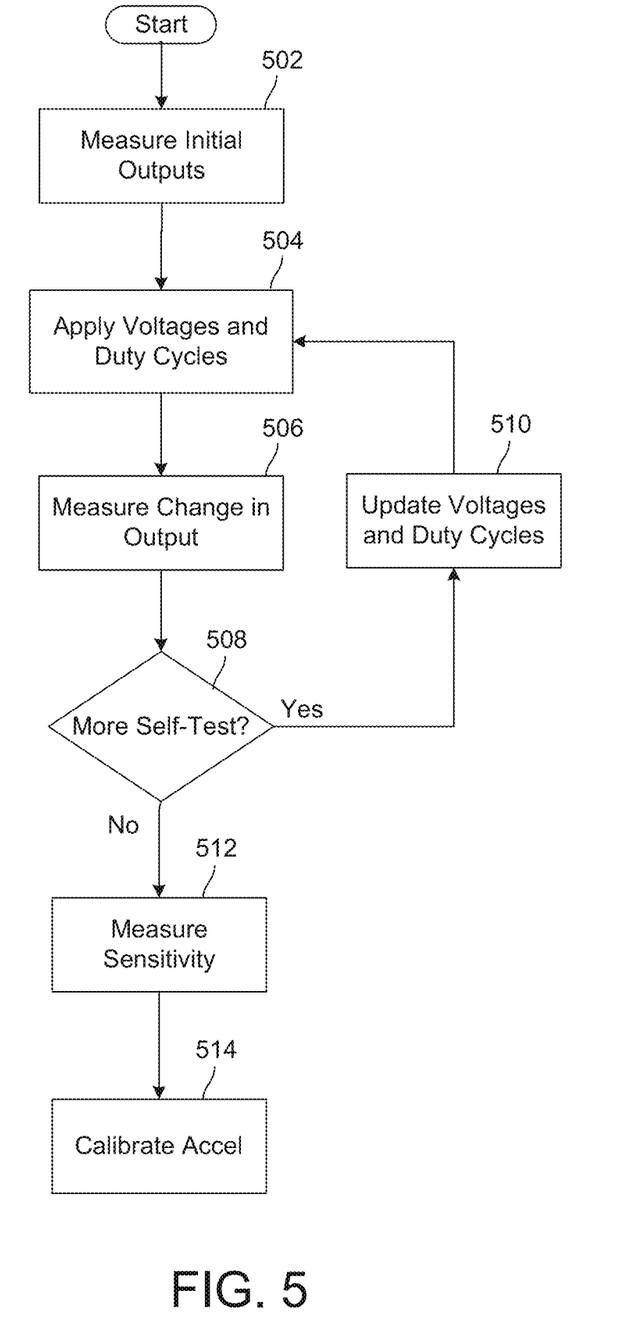
FIG. 5 depicts exemplary steps for performing self-test and calibration, in accordance with at least some embodiments of the present disclosure.

FIG. 5 depicts exemplary steps for performing self-test and calibration, in accordance with at least some embodiments of the present disclosure. Although FIG. 5 is described in the context of the particular structures, components, and processing of the present disclosure, it will be understood that the methods and steps described in FIG. 5 may be applied to a variety of MEMS accelerometer designs, self-test methods, processing circuitry, and calibration techniques. Although a particular order and flow of steps is depicted in FIG. 5, it will be understood that in some embodiments one or more of the steps may be modified, moved, removed, or added, and that the order of steps depicted in FIG. 5 may be modified.

Exemplary steps for self-test and calibration may begin at step 502, at which initial output values for the MEMS accelerometer (e.g., voltages representative of the measured capacitance associated one or more proof masses and each proof mass's associated drive electrodes) may be measured. These initial values correspond to the output of the MEMS accelerometer without applied electrostatic forces from self-test signals of the drive electrodes (e.g., with balanced electrostatic forces based on differential drive electrode signals having equal duty cycles and peak-to-peak voltages). Once these initial baseline values are obtained, processing may continue to step 504.

At step 504, an initial self-test signal pattern may be applied to the self-test electrodes. In some embodiments, differential signals are applied to respective drive electrodes associated with each proof mass of the MEMS accelerometer. The self-test signal pattern includes a peak-to-peak voltage and a duty cycle that is selected (e.g., at a value of greater than or less than 50%) such that one of the drive electrodes applies a signal that has the selected duty and the other of the drive electrodes applies a signal that is complementary to the selected duty cycle. In this manner, a net electrostatic force is applied to the proof mass(es), with an attractive force moving the proof mass in the direction of the drive electrode with the greater effective DC voltage (e.g., the proof mass that has a duty cycle greater than 50%). Once the self-test signal pattern is applied to the drive electrodes, processing may continue to step 506.

At step 506, the change in the accelerometer output due to the movement of the proof mass(es) in response to the applied electrostatic force from the self-test signals may be measured. The accelerometer output may be measured over a suitable period of time to discard and/or filter any results that are impacted by externally applied linear accelerations or vibrations. Once accelerometer outputs due to the applied electrostatic forces (i.e., based on the self-test signals applied to the drive electrodes) are measured and processed (e.g., scaled, normalized, and/or otherwise modified for storage and comparison to other measured self-test responses), processing may continue to step 508.

At step 508, it may be determined whether more self-test voltages need to be applied. As described herein, at least a second application of self-test signals to the drive electrodes (e.g., with the respective duty cycles applied to the respective drive electrodes swapped) may be utilized to create an electrostatic force in the opposite direction. In some embodiments (not depicted in FIG. 5), additional steps such as discharge or filtering of charging voltages on the MEMS accelerometer may be performed, or in some designs, the effect of charging may be de minimis. In other embodiments, further iterations with different duty cycles and/or peak-to-peak voltages may be used for self-test signals, for example, to apply a variety of different electrostatic forces to the proof mass to identify different response patterns, or to remove charging effects as described herein. If more self-test signals are to be applied to the drive electrodes, processing may continue to step 510, at which the voltages and/or duty cycles of the self-test signals are updated before repeating the processing of steps 504-508. If all self-test signals have been applied and all accelerometer outputs have been measured, processing may continue to step 512.

At step 512, the sensitivity of the MEMS accelerometer may be determined from the measured output values. As described herein, the electrostatic forces imparted by the self-test signals are based on known applied signal patterns, and the measured output values of the MEMS accelerometer are used to determine sensitivity and/or sensitivity error. The sensitivity variation measured with the electrical self-test is proportional to the acceleration sensitivity. Once the sensitivity is determined at step 512, processing may continue to step 514.

At step 514, the MEMS accelerometer may be calibrated based on the sensitivity measurements. In an embodiment, operational parameters of the MEMS accelerometer may be modified, such as by increasing scaling factors and/or gains based on reduced sensitivity, decreasing scaling factors and/or gains based on increased sensitivity, modifying filter parameters based on non-linear changes in sensitivity, modifying digital filtering outputs, and modifying weighting applied to calculation of parameters that are based on outputs from multiple sensors. Once the calibration is complete, the processing of FIG. 5 may end until the next self-test routine is executed (e.g., at device startup, during a period of extended inactivity, etc.).

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical (MEMS) accelerometer, comprising:
   a proof mass that moves along a sense axis in response to a linear acceleration;
   a first drive electrode located adjacent to the proof mass along the sense axis;
   a second drive electrode located adjacent to the proof mass along the sense axis and on an opposite side of the proof mass from the first drive electrode; and
   processing circuitry coupled to the proof mass, the first drive electrode, and the second drive electrode, wherein the processing circuitry is configured to:
      provide a first self-test signal pattern to the first drive electrode and the second drive electrode, wherein the first self-test signal pattern has a first duty cycle applied to the first drive electrode and a first complementary duty cycle applied to the second drive electrode;
      measure a first received signal from the proof mass in response to the first self-test signal pattern;
      provide a second self-test signal pattern to the first drive electrode and the second drive electrode, wherein the second self-test signal pattern has a second duty cycle applied to the first drive electrode and a second complementary duty cycle applied to the second drive electrode, wherein the first duty cycle is different than the second duty cycle, and wherein a first peak-to-peak voltage of the first self-test signal pattern is different than a second peak-to-peak voltage of the second self-test signal pattern;
      measure a second received signal from the proof mass in response to the second self-test signal pattern; and
      determine a sensitivity of the MEMS accelerometer based on the first received signal and the second received signal.

2. The MEMS accelerometer of claim 1, wherein a first common mode signal applied to the proof mass by the first drive electrode and the second drive electrode during the first self-test signal pattern causes the proof mass to move toward one of the first drive electrode or the second drive electrode and away from the other of the first drive electrode or the second drive electrode.

3. The MEMS accelerometer of claim 2, wherein a second common mode signal applied to the proof mass by the first drive electrode and the second drive electrode during the second self-test signal pattern causes the proof mass to move away from the one of the first drive electrode or the second drive electrode and towards the other of the first drive electrode or the second drive electrode.

4. The MEMS accelerometer of claim 3, wherein a first root mean square (RMS) voltage of the first drive electrode during the first self-test signal pattern is greater than a voltage of the proof mass, a first RMS voltage of the second drive electrode during the first self-test signal pattern is less than the voltage of the proof mass, a second RMS voltage of the first drive electrode during the second self-test signal pattern is less than the voltage of the proof mass, and a second RMS voltage of the second drive electrode during the second self-test signal pattern is greater than the voltage of the proof mass.

5. The MEMS accelerometer of claim 1, wherein the processing circuitry is configured to modify a sensed acceleration based on the determined sensitivity.

6. The MEMS accelerometer of claim 5, wherein the processing circuitry is configured to identify an error when a change in the determined sensitivity exceeds a threshold.

7. The MEMS accelerometer of claim 1, wherein the proof mass, the first drive electrode, and the second drive electrode are all located within a MEMS layer of the MEMS accelerometer.

8. The MEMS accelerometer of claim 1, wherein the proof mass is located within a MEMS layer, further comprising a substrate layer parallel to a lower surface of the MEMS layer, wherein the first drive electrode and the second drive electrode are located on the substrate layer.

9. The MEMS accelerometer of claim 1, wherein the first peak-to-peak voltage ($V_1$), the second peak-to-peak voltage ($V_2$), the first duty cycle ($D_1$), and the second duty cycle ($D_2$), are determined according to the following: $2V_1*(2D_1-1)=2V_2*(2D_2-1)$.

10. A microelectromechanical (MEMS) accelerometer, comprising:
    a proof mass that moves out of a MEMS plane in response to a linear acceleration;
    a first drive electrode located adjacent to a first portion of the proof mass in a direction of a movement of the proof mass out of the MEMS plane;
    a second drive electrode located adjacent to a second portion of the proof mass in the direction of the movement of the proof mass out of the MEMS plane; and
    processing circuitry coupled to the proof mass, the first drive electrode, and the second drive electrode, wherein the processing circuitry is configured to:
       provide a first self-test signal pattern to the first drive electrode and the second drive electrode, wherein the first self-test signal pattern has a first duty cycle applied to the first drive electrode and a first complementary duty cycle applied to the second drive electrode;
       measure a first received signal from the proof mass in response to the first self-test signal pattern;
       provide a second self-test signal pattern to the first drive electrode and the second drive electrode, wherein the second self-test signal pattern has a second duty cycle applied to the first drive electrode and a second complementary duty cycle applied to the second drive electrode, wherein the first duty cycle is different than the second duty cycle, and wherein a first peak-to-peak voltage of the first self-test signal pattern is different than a second peak-to-peak voltage of the second self-test signal pattern;
       measure a second received signal from the proof mass in response to the second self-test signal pattern; and
       determine a sensitivity of the MEMS accelerometer based on the first received signal and the second received signal.

11. The MEMS accelerometer of claim 10, wherein the proof mass is located within a MEMS layer, further comprising a substrate layer parallel to a lower surface of the MEMS layer, wherein the first drive electrode and the second drive electrode are located on the substrate layer.

12. The MEMS accelerometer of claim 10, wherein the first peak-to-peak voltage ($V_1$), the second peak-to-peak voltage ($V_2$), the first duty cycle ($D_1$), and the second duty cycle ($D_2$), are determined according to the following: $2V_1*(2D_1-1)=2V_2*(2D_2-1)$.

13. A method for performing self-test calibration of a MEMS accelerometer, comprising:

providing a first self-test signal pattern to a first drive electrode and a second drive electrode, wherein the first self-test signal pattern has a first duty cycle applied to the first drive electrode and a first complementary duty cycle applied to the second drive electrode, wherein the first drive electrode is located adjacent to a proof mass along a sense axis, wherein the second drive electrode is located adjacent to a different portion of the proof mass along the sense axis, and wherein the proof mass moves along the sense axis in response to a linear acceleration;

measuring a first received signal from the proof mass in response to the first self-test signal pattern;

providing a second self-test signal pattern to the first drive electrode and the second drive electrode, wherein the second self-test signal pattern has a second duty cycle applied to the first drive electrode and a second complementary duty cycle applied to the second drive electrode, wherein the first duty cycle is different than the second duty cycle, and wherein a first peak-to-peak voltage of the first self-test signal pattern is different than a second peak-to-peak voltage of the second self-test signal pattern;

measuring a second received signal from the proof mass in response to the second self-test signal pattern; and determining a sensitivity of the MEMS accelerometer based on the first received signal and the second received signal.

14. The method of claim 13, further comprising modifying a sensed acceleration based on the determined sensitivity.

* * * * *